US008439337B2

(12) United States Patent
Kott

(10) Patent No.: US 8,439,337 B2
(45) Date of Patent: May 14, 2013

(54) WING POSITIONING AND MOUNTING SYSTEM

(75) Inventor: Horst Kott, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 337 days.

(21) Appl. No.: 12/789,286

(22) Filed: May 27, 2010

(65) Prior Publication Data

US 2010/0264573 A1 Oct. 21, 2010

Related U.S. Application Data

(63) Continuation of application No. PCT/EP2007/063031, filed on Nov. 29, 2007.

(51) Int. Cl.
*B25B 1/24* (2006.01)

(52) U.S. Cl.
USPC .................................. 269/5; 269/17; 269/329

(58) Field of Classification Search ................ 269/5, 55, 269/60, 71, 17, 37, 329
See application file for complete search history.

(56) References Cited

U.S. PATENT DOCUMENTS

| | | | | |
|---|---|---|---|---|
| 3,572,637 | A * | 3/1971 | Mitchell, Jr. | 254/385 |
| 3,659,824 | A * | 5/1972 | Johnson | 254/124 |
| 4,071,222 | A * | 1/1978 | Wright | 254/8 C |
| 4,461,455 | A * | 7/1984 | Mills et al. | 254/3 R |
| 4,522,548 | A * | 6/1985 | Oswald et al. | 414/458 |
| 4,708,251 | A * | 11/1987 | Picard et al. | 212/294 |
| 5,141,371 | A * | 8/1992 | Pish | 414/229 |
| 5,460,474 | A * | 10/1995 | Iles | 414/590 |
| 5,653,005 | A * | 8/1997 | Speller et al. | 29/701 |
| 6,230,382 | B1 | 5/2001 | Cunningham et al. | |
| 6,257,522 | B1 * | 7/2001 | Friend et al. | 244/118.1 |
| 6,292,999 | B1 * | 9/2001 | Rossway et al. | 29/559 |
| 6,497,389 | B1 * | 12/2002 | Rawdon et al. | 244/138 R |
| 6,648,311 | B2 * | 11/2003 | Groomes | 267/64.28 |
| 7,264,226 | B2 * | 9/2007 | Smith et al. | 254/93 R |
| 7,264,434 | B2 * | 9/2007 | Kozak | 414/672 |
| 7,398,586 | B2 * | 7/2008 | Prichard et al. | 29/448 |
| 8,146,242 | B2 * | 4/2012 | Prichard et al. | 29/771 |
| 2005/0172470 | A1 | 8/2005 | Cobb et al. | |
| 2007/0107189 | A1 * | 5/2007 | Prichard et al. | 29/448 |
| 2010/0264573 | A1 * | 10/2010 | Kott | 269/55 |

FOREIGN PATENT DOCUMENTS

| | | | |
|---|---|---|---|
| EP | 0 957 335 | A | 11/1999 |
| FR | 2 821 778 | A | 9/2002 |
| JP | 2006 051557 | A | 2/2006 |

OTHER PUBLICATIONS

International Search Report for PCT/EP2007/063031 mailed Aug. 6, 2008.

Chinese Office Action for Application 2006100836019 mailed Mar. 7, 2008.

* cited by examiner

*Primary Examiner* — Lee D Wilson

(74) *Attorney, Agent, or Firm* — Ingrassia Fisher & Lorenz P.C.

(57) ABSTRACT

A positioning system is provided for mounting a wing of an aircraft to a fuselage of the aircraft. The positioning system includes, but is not limited to a programmable mounting unit that can perform a final adjustment and alignment of the wing with respect to the fuselage without user interaction.

5 Claims, 2 Drawing Sheets

WING POSITIONING AND MOUNTING SYSTEM

CROSS-REFERENCE TO RELATED APPLICATIONS

This is a continuation of International Application No. PCT/EP2007/063031, filed Nov. 29, 2007, which is hereby incorporated by reference in its entirety.

TECHNICAL FIELD

The present invention relates to the field of airplane assembling. In particular, the present invention relates to a positioning system for mounting a wing of an aircraft to a fuselage of the aircraft, to a method for mounting a wing, a computer-readable medium, a data processor and a program element.

BACKGROUND

In order to assemble an airplane, the wings of the airplane have to be mounted to the fuselage. Therefore, the wings are arranged on a positioning unit, which is adapted for moving the wing to the fuselage. Then, positioning holes in the fuselage and in the wing are adjusted such that the wing is optimally aligned with respect to the fuselage. After adjusting the positioning holes, the final bore holes can be drilled. After that, the positioning unit is, together with the wing, removed from the fuselage such that the bore holes can be cleaned and burred. Furthermore, a sealing with a sealing compound is performed and brackets can be pre-drilled and adjusted. Such brackets are adapted as internal connection elements between wing and fuselage.

However, after having the wing cleaned and the drill holes burred, the positioning unit has to be moved back and the wing has to be adjusted with respect to the fuselage for final mounting.

In view of the foregoing, it may be at least one object of the present invention to provide for an improved mounting of a wing to a fuselage of an aircraft. In addition, other objects, desirable features, and characteristics may become apparent from the subsequent summary and detailed description, and the appended claims, taken in conjunction with the accompanying drawings and this background.

SUMMARY

According to an exemplary embodiment of the present invention, a positioning system for mounting a wing of an aircraft to a fuselage of the aircraft is provided, the positioning system, comprising a mounting unit and a calculation unit, wherein the mounting unit is adapted for moving the wing relative to the fuselage from the first position to the second position, wherein, in the first position, the wing and the fuselage are separated from each other, such that the wing can be cleaned and drill holes can be burred, wherein, in the second position, the wing and the fuselage are in a mounting position, such that the wing can be mounted to the fuselage, and wherein the movement from the first position to the second position is guided by the calculation unit.

Therefore, according to this exemplary embodiment of the present invention, the movement from the cleaning position back to the mounting position (after the drill holes have been burred and the wing has been cleaned) is performed in an automated or semi-automated manner. Thus, a time consuming and difficult readjustment and realignment of the wing with respect to the fuselage does not have to be performed by a user but is performed computer guided.

According to another exemplary embodiment of the present invention, the mounting unit is further adapted for aligning the wing relative to the fuselage, thereby defining the mounting position, and moving the wing from the mounting position to the second position, such that the wing can be cleaned and the drill holes can be burred.

For example, the initial alignment of the wing may be performed by a user. After that, the wing is removed from the fuselage and cleaned. The second and final alignment of the wing is then performed in an automated manner with computer guidance.

According to another exemplary embodiment of the present invention, the calculation unit is adapted for storing position data corresponding to the mounting position after alignment of the wing, wherein the guidance of the movement from the first position to the second position is performed on the basis of the position data.

Thus, after having performed the initial alignment, the corresponding position data is stored by the computer system. This position data is then used for any further alignment processes.

According to another exemplary embodiment of the present invention, the guidance of the movement from the first position to the second position is performed automatically without user interaction. This may provide for a fast and fully automated final positioning of the wing.

According to another exemplary embodiment of the present invention, the guidance of the movement from the first position to the second position is performed semi-automatically with user interaction.

For example, this may provide for a user interaction which may define the speed of the final alignment procedure. For example, in case of an emergency event, the user may reduce the alignment speed or even stop the positioning process.

According to another exemplary embodiment of the present invention, the positioning system further comprises a central calculation unit adapted for transmitting control signals to the calculation unit and for receiving position signals from the calculation unit.

Thus, the positioning procedure may be tracked and controlled by an external central calculation unit. Such a central calculation unit may be adapted for tracking and guiding several individual mobile mounting units and may be supervised by a user.

According to another exemplary embodiment of the present invention, the positioning system further comprises a control unit connected to the central calculation unit and adapted for receiving user input.

According to this exemplary embodiment of the present invention, user input may be directly input into the control unit, which may then transmit the received user input signals to the central calculation unit which, in turn, may transmit corresponding control signals to the (mobile) calculation unit of the mounting unit. This may provide for a user supervision or user control.

According to another exemplary embodiment of the present invention, a method for mounting a wing of an aircraft to a fuselage of the aircraft is provided, the method comprising the steps of moving the wing relative to the fuselage from a first position to a second position, wherein, in the first position, the wing and the fuselage are separated from each other, such that the wing can be cleaned and the drill holes can be burred, wherein, in the second position, the wing and the fuselage are in a mounting position, such that the wing can be mounted to the fuselage, and wherein the movement from the first position to the second position is guided by a calculation unit. This may provide for a fast and effective method for final alignment of the wing.

Furthermore, according to another exemplary embodiment of the present invention, the method further comprises the steps of aligning the wing relative to the fuselage, thereby defining the mounting position, and moving the wing from the mounting position to the second position, such that the wing can be cleaned and the drill holes can be burred.

Furthermore, according to another exemplary embodiment of the present invention, a computer-readable medium may be provided, in which a computer program for mounting a wing of an aircraft to a fuselage of the aircraft is stored which, when being executed by a calculation unit, causes the calculation unit to carry out the above-mentioned method steps.

Beyond this, according to another exemplary embodiment of the present invention, a program element for mounting a wing of an aircraft to a fuselage of the aircraft is provided, which, when being executed by a calculation unit, causes the calculation unit to carry out the above-mentioned method steps.

Furthermore, according to another exemplary embodiment of the present invention, a data processing unit for mounting a wing of an aircraft to a fuselage of the aircraft is provided, the data processing unit comprising a memory for storing a mounting position of the wing and a calculation unit adapted for carrying out the above-mentioned method steps.

Those skilled in the art will readily appreciate that the method of mounting a wing may be embodied as the computer program, i.e., by software, or may be embodied using one or more special electronic optimisation circuits, i.e. in hardware, or the method may be embodied in hybrid form, i.e., by software components and hardware components.

The program element, according to an exemplary embodiment of the present invention, may preferably be loaded into working memories of a data processor. The data processor may thus be equipped to carry out exemplary embodiments of the methods of the present invention. The computer program may be written in suitable programming language, such as, for example, C++ and may be stored on a computer-readable medium, such as a CD-ROM. Also, the computer program may be available from a network, such as the World Wide Web, from which it may be downloaded into image processing units or processors, or any suitable computers.

These and other aspects of the present invention will become apparent from and elucidated with reference to the embodiments described hereinafter.

BRIEF DESCRIPTION OF THE DRAWINGS FIGURES

The invention will now be described, by way of example only, with reference to the accompanying drawings, in which.

DETAILED DESCRIPTION

Figure 1:
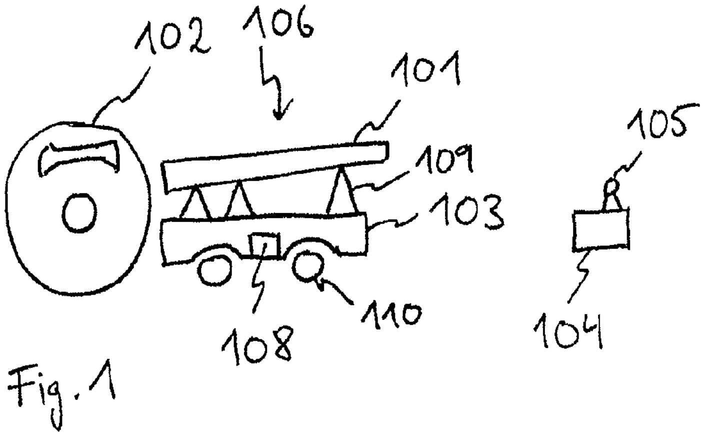
FIG. 1 shows a simplified schematic representation of a positioning system arranged in a first position according to an exemplary embodiment of the present invention.

The following detailed description of the invention is merely exemplary in nature and is not intended to limit application and uses. Furthermore, there is no intention to be bound by any theory presented in the preceding background or summary or the following detailed description.

The illustration in the drawings is schematic. In different drawings, similar or identical elements are provided with the same reference numerals.

FIG. 1 shows a schematic representation of a positioning system arranged in a first position 106 according to an exemplary embodiment of the present invention. The positioning system depicted in FIG. 1 comprises a mounting unit 103 adapted for mounting a wing 101. The mounting unit 103 comprises a calculation unit 108 adapted for guiding a movement of the mounting unit 103. Furthermore, the mounting unit 103 is adapted for aligning the wing 101. Such alignment may be performed by means of alignment units 109, together with movement units 110. The alignment units 109 are adapted for moving the wing 101 vertically and, if need be, horizontally. By using for example three alignment units 109 arranged in a triangular manner, the wing 101 may be moved and tilted in every desired direction.

In the position depicted in FIG. 1 (i.e., the first position), the wing 101 and the fuselage 102 are separated from each other. Therefore, pre-drilled holes may be burred and the wing may be cleaned before performing a final alignment and mounting of the wing to the fuselage.

Furthermore, a central calculation unit 104 is provided which is adapted to communicate with the mobile calculation unit 108, for example, via a wireless communication link or other means of communication, such as a standard wire based communication link. The central calculation unit 104 is connected to a control unit 105 which is adapted for receiving user input. For example, a user may define the alignment or movement speed of the mounting unit 103, or a user may interfere with the positioning procedure, for example, in case of an emergency.

Figure 2:
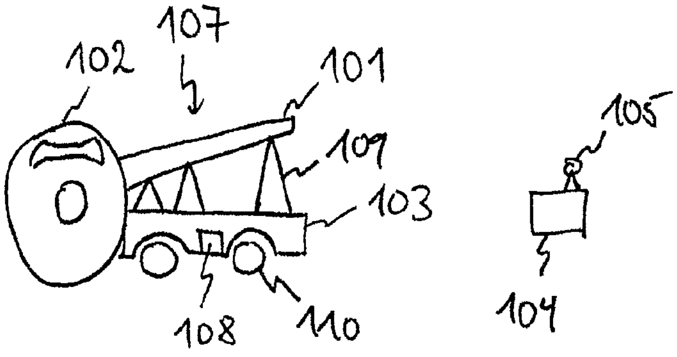
FIG. 2 shows a schematic representation of a positioning system arranged in a second position according to an exemplary embodiment of the present invention.

FIG. 2 shows a schematic representation of the positioning system in a second position 107 according to an exemplary embodiment of the present invention. In the second position 107, the mounting unit 103 has been moved towards the fuselage 102, thereby providing an alignment of the wing 101 with respect to the fuselage 102. In the second position 107, a final mounting of the wing 101 to the fuselage 102 can be performed. The movement from the first position 106 to the second position 107 is guided by the calculation unit 108, with or without interaction from the central calculation unit 104 (and/or the user).

A manual alignment may not be necessary, since the movement of the mounting unit 103 is guided by the calculation unit 108.

Figure 3:
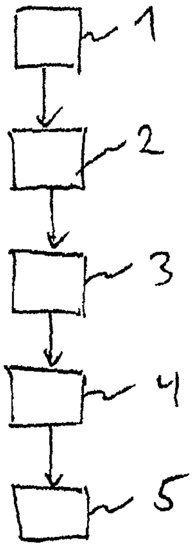
FIG. 3 shows a flow-chart of a method according to an exemplary embodiment of the present invention.

FIG. 3 shows a flow chart of a method according to an exemplary embodiment of the present invention. The method starts with Step 1 in which the wing is aligned relative to the fuselage. Now, in Step 2, pre-drill holes can be drilled and the position data corresponding to this aligned position is stored in a memory of a data processing unit. Then, in Step 3, the mounting unit is moved away from the fuselage, such that the wing and fuselage are now separated from each other. In Step 4, the wing is cleaned and the pre-drill holes are burred. Then, in Step 5, the mounting unit, together with the wing, is moved back into the mounting position. This backward movement is performed in a computer guided manner on the basis of the stored position data. Next, a final mounting of the wing can be performed. The alignment procedure, according to embodiments of the invention provides a very accurate and very exact alignment. For example, the accuracy of the procedure may be up to 1/10th of an acceptable tolerance.

Figure 4:
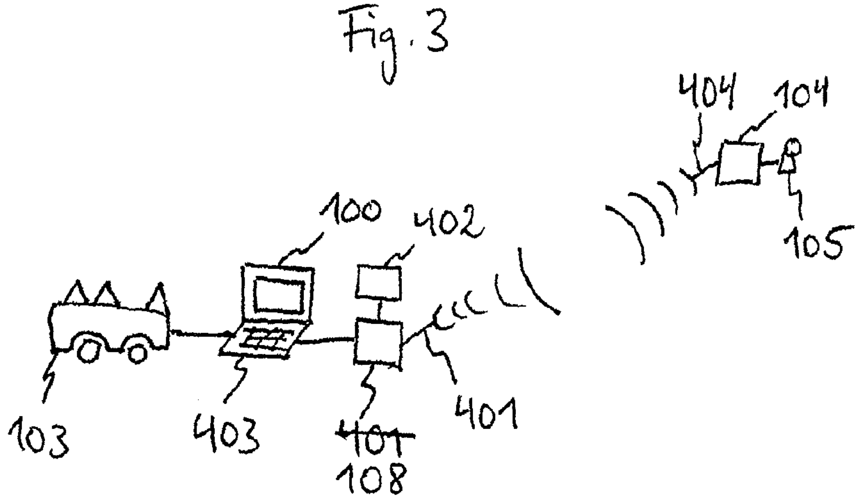
FIG. 4 shows an exemplary embodiment of a positioning system comprising a data processing unit according to the present invention, for executing an exemplary embodiment of a method in accordance with the present invention.

FIG. 4 shows an exemplary embodiment of a positioning system according to the present invention. The positioning system comprises a mounting unit 103, an input unit 403, an output unit 100, a calculation unit 108, a computer-readable medium 402 and a communication link 401.

The input unit 403 may be adapted for providing a user input directly to the calculation unit 108. The output unit 100 is adapted for providing output information corresponding to positioning data, positioning speed and other parameters which may be of interest.

Furthermore, a central calculation unit 104 is provided together with a control unit 105. Over the communication link 404 a communication between the central calculation unit 104 and the mobile calculation unit 108 is provided. According to an embodiment of the present invention, the automated or semi-automated positioning of the wing can be controlled both by means of the mobile input unit 403 and by means of the stationary, control unit 105.

It should be noted that the term "comprising" does not exclude other elements or steps and the "a" or "an" does not exclude a plurality. Also, elements described in association with different embodiments may be combined. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A positioning system for mounting a wing of an aircraft to a fuselage of the aircraft, the positioning system comprising:

a mounting unit including a base and wheels that:

aligns the wing relative to the fuselage, thereby defining a mounting position whereby a plurality of alignment units perform said mounting positioning, moves the wing from the mounting position to a first position, and moves the wing relative to the fuselage from the first position to a second position, wherein, in the first position, the wing and the fuselage are separated from each other, such that the wing can be cleaned and drill holes can be burred, and in the second position, the wing and the fuselage are in the mounting position, such that the wing can be mounted to the fuselage; and a calculation unit to guide the movement of the mounting unit from the first position to the second position wherein the calculation unit is adapted for storing position data corresponding to a mounting position after alignment of the wing; and wherein guidance of the movement from the first position to the second position is performed on at least a basis of the position data also said calculation unit controls movement of the base.

2. The positioning system of claim 1, wherein guidance of the movement from the first position to the second position is performed automatically without user interaction.

3. The positioning system of claim 1, wherein guidance of the movement from the first position to the second position is performed semi-automatically with user interaction.

4. The positioning system of claim 1, further comprising a central calculation unit adapted for transmitting control signals to the calculation unit and for receiving position signals from the calculation unit.

5. The positioning system of claim 4, further comprising a control unit connected to the central calculation unit and adapted for receiving user input.

* * * * *